United States Patent [19]
Falco

[11] Patent Number: 5,917,576
[45] Date of Patent: Jun. 29, 1999

[54] EYEWEAR ASSEMBLY

[75] Inventor: Robert N. Falco, Indianapolis, Ind.

[73] Assignee: Cabot Safety Intermediate Corporation, Southbridge, Mass.

[21] Appl. No.: 08/957,489

[22] Filed: Oct. 24, 1997

[51] Int. Cl.[6] .................................................... G02C 3/00
[52] U.S. Cl. ................................................................. 351/157
[58] Field of Search ......................... 351/155, 156, 351/157, 158, 111, 123; 24/3.3, 3.4

[56] References Cited

U.S. PATENT DOCUMENTS

| 4,133,604 | 1/1979 | Fuller | 351/123 |
|---|---|---|---|
| 4,696,556 | 9/1987 | Perry, III | 351/157 |
| 4,974,956 | 12/1990 | Gill | 158/156 |
| 5,369,452 | 11/1994 | Williams | 351/157 |
| 5,575,042 | 11/1996 | Kalbach | 24/3.3 |

*Primary Examiner*—George Manuel
*Attorney, Agent, or Firm*—Cantor Colburn LLP

[57] ABSTRACT

An eyewear assembly comprising a set of eyewear having a lens piece, two temple pieces, and an attachment member securely connected to each temple piece. The attachment member has a first predetermined length and upon extension to a second length, retains the second length.

20 Claims, 1 Drawing Sheet

EYEWEAR ASSEMBLY

BACKGROUND OF THE INVENTION

1. Field of the Invention

The present invention relates to accessories for eyewear devices and, more particularly, to an eyewear assembly comprising a flexible cord having an adjustable length.

2. Description of the Related Art

There are many types of eyewear, including sunglasses, safety glasses, corrective eyeglasses and the like (hereinafter collectively termed "eyewear"). Eyewear protects a wearer's eyes from environmental effects such as glare, wind and airborne particles, and/or they compensate for visual defects including myopia and astigmatism. Furthermore, health and safety regulations require that individuals working in noisy environments be protected by wearing appropriate safety equipment, such as hearing protectors. Various types of hearing protectors are currently available to workers for this purpose, such as earplugs, ear muffs and semi-aural hearing protectors. Of these, earplugs have gained universal acceptance in both industrial and consumer settings because of their size, comfort, economy and attenuation characteristics.

In general, a set of eyewear comprises a metallic or plastic frame and a pair of glass or plastic lenses. The frame generally includes a lens piece and two temple pieces. The unitary lens piece holds or supports the lenses in a plane in front of the wearer's eyes. A curved bridge is formed into the lens piece between the frame portions that hold the lenses. The lens piece also has two sides adjacent to the lenses which are each hingeably connected to one of the temple pieces.

Although earplugs and eyewear may be provided separately, it is often desirable to provide them with suitable attachments to prevent loss should the they become dislodged. For example, it is important in the food processing industry to prevent any foreign matter from entering food products. As a result, various types of cords or connectors for attaching a pair of eyeglasses (or similarly earplugs) have been developed, as exemplified in U.S. Pat. Nos. 5,074,375 to Grozil; 4,314,553 to Westerdal; 4,253,452 to Powers et al.; 4,219,018 to Draper, Jr.; 4,193,396 to Wacker; 3,871,372 to Bivins; 2,704,961 to Weil; and 2,649,020 to Wheeler.

Typically, the cord is a relatively long, continuous and flexible material fixed to, and extending between, the temple bars at the ends closest to the wearer's ear. The cord is of sufficient length, generally ranging from between 21 inches to 27 inches, to extend from one ear to the other ear of a wearer while further providing enough slack to secure the cord to some convenient portion of the wearer's apparel, e.g. a shirt collar, or to be draped around the neck of a wearer when not in use. Suitable materials for such cords are conventional in nature and include natural and synthetic materials, for example, cotton, wool, plastic, plastic such as polyvinylchloride, and may be in the form of a continuous solid strand or a braided/twisted multi-strand construction.

While such cords serve their intended function, several disadvantages are associated with their use. For example, at the lengths noted above, the cord itself must be fastened (e.g. using a "cigar-type" band) to prevent tangling and/or knotting during shipping. Therefore, in addition to the extra material needed to fasten the cords, additional handling and preparation for packaging is also required. As such, excessive material waste is of concern as well as maintaining the sanitary integrity of the plugs.

A need therefore remains for alternative attachment mechanisms for earplugs and eyewear which provide adequate strength and flexibility to the user, and which solve the problems related to excessive cord length.

SUMMARY OF THE INVENTION

Accordingly, the present invention provides an eyewear assembly which includes a set of eyewear frames with two temple members, and the above-described attachment member securely connected to an end of each temple member. The attachment member has a first predetermined length and is capable of being extended to a second length. Once extended, the attachment member retains its extended second length.

The present invention thus provides an alternative cord mechanism for eyewear which provides users with the ability and flexibility to customize the cord mechanism to an optimum length and style, thereby minimizing risk of Displacement and loss by the user. In addition, the eyewear assembly can be simply and inexpensively produced.

BRIEF DESCRIPTION OF THE DRAWINGS

The foregoing and other objects and advantages of the invention will be appreciated more fully from the following drawings.

DETAILED DESCRIPTION OF THE INVENTION

Figure 1:
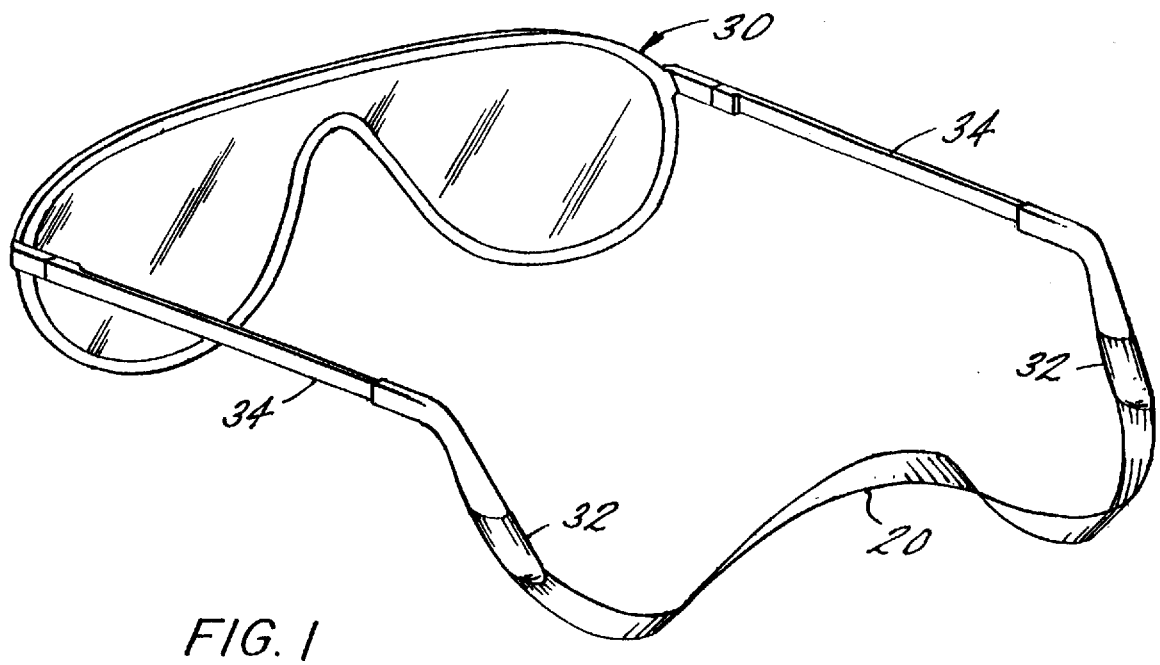
FIG. 1 is a perspective view of an eyewear assembly in accordance with the present invention, wherein the attachment member has a first length.
Figure 2:
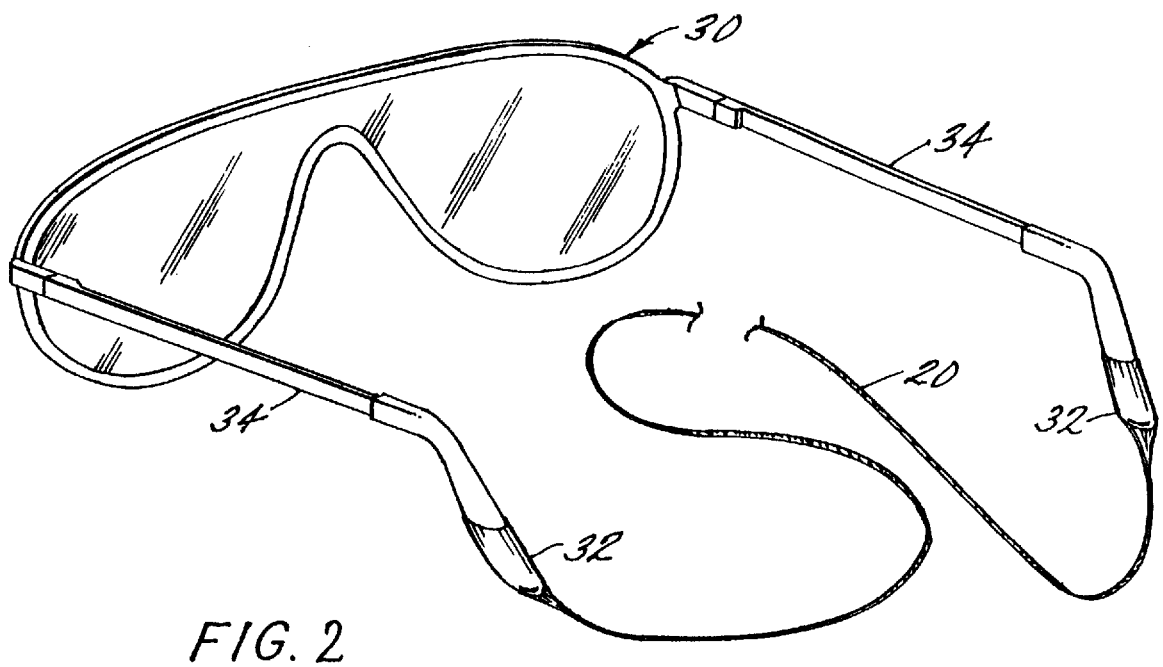
FIG. 2 is a perspective view of a second embodiment of the eyewear assembly shown in FIG. 1, wherein the attachment member, shown with a broken line, has been extended to a second length.

Referring now to FIGS. 1 and 2, wherein like reference numerals refer to like features, the eyewear assembly of the present invention includes a pair of eyewear frames comprising temple pieces 34 and prescription or non-prescription lenses 30, having the ends of two temple members 32 interconnected by attachment member 20. The material of attachment member 20, once extended by the wearer prior to use, must be capable of retaining its extended length as depicted in FIG. 2. In other words, such material should not be of an elastic nature but capable of deformation, i.e., permanent stretch.

Attachment member 20 is composed of a flexible material which should be pliant or limp enough to mitigate. In addition, the material should be of sufficient strength so as to accomplish its intended purpose of securing temples 34 to each other, thereby allowing the wearer to retain the assembly during use or while resting around the wearer's neck. However, the material should not be so strong as to constitute a hazard to the wearer should attachment member 20 become entangled in machinery or other apparatus. In addition, attachment member 20 should possess good tear strength and stretchability properties. Finally, the material of attachment member 20, once extended by the wearer prior to use, must be capable of retaining its extended length, as depicted in FIGS. 1 and 2. In other words, such material should not be of an elastic nature but capable of deformation, i.e. permanent stretch.

In general, materials exhibiting the above properties which have been found to be suitable for use as attachment member 20 include, for example, polypropylene, polyethylene, copolymers of polypropylene and polyethylene, high-impact polystyrene, acrylonitrile-butadiene styrene (ABS) resin and the like. Preferred materials include low density polyethylene (based on octene, hexene, butene and comonomers thereof), ethylene vinyl acetate (EVA), and high density polyethylene. Most preferred are materials which are easily deformed and possess a low modulus, thereby yielding a softer material. Such materials include, for example, linear-low-density polyethylene (LLDPE) and ultra low density ethylene octene copolymers, such as those commercially available as ATTANE® copolymers (ATTANE is a registered trademark of Dow Chemical Company, Midland, Mich.) and as DOWLEX® LLDPE (DOWLEX is a registered trademark of Dow Chemical Company, Midland, Mich).

The tailoring of the strength and length of attachment member 20 is accomplished by suitable manipulation of the material of construction thereof By taking into consideration the elongation/stretch factors and other physical properties of the material, a suitable length having a particular cross-sectional dimension may be selected in the shape of a film, cord, tube and the like. Although the first predetermined length of attachment member 20 will vary depending on the material of construction, a length of between 2 inches and 10 inches has been found suitable to provide good strength, flexibility and customization while minimizing excess material during packaging. When the length of attachment member 20 has fallen into the above range, suitable corresponding width and thickness for a film range between ½ and ⅝ inches and 0.002 mils and 0.004 mils, respectively. When the material of construction of attachment member is an ultra low density ethylene octene copolymer, attachment member 20 has a preferred length between 4 inches and 6 inches, width between ½ and ⅝ inches and a dimension thickness between 0.002 mils and 0.004 mils.

Attachment member 20 is securely connected to eyewear temple member 32 at its end utilizing conventional techniques, such as mechanical or adhesive bonding, thermal-weld, ultrasonic weld, and the like. In addition, attachment member 20 may be densified and inserted into preformed holes.

The second length of attachment member 20 is customized by each wearer to an individual style and comfort for example by grasping the eyewear and the attachment member 20 approximately at its center, and slowly pulling the eyewear and attachment member away from each other in an outwardly direction, thereby elongating or stretching attachment member 20 until the desired length or until a slight resistance is felt. Similar to the first predetermined length, attachment member 20 will have a second length, as illustrated in FIG. 2, which will vary from user to user. Typically, it has been found that a second length between about 20 inches and about 30 inches provides sufficient length, security and comfort to the wearer. However, it should be noted that the maximum extended length will be determined by the break resistance of the material of construction.

The present invention provides an eyewear assembly having an alternative attachment mechanism which enables users to customize the eyewear attachment to an optimum length and personal style. In addition, the eyewear assembly is simple and inexpensive to manufacture and minimizes the waste and cost associated with additional fasteners and bulky packaging. For example, it has been found that using the attachment mechanism of the present invention provided a reduction of 80% by weight and 70% in length of the material of construction.

The present invention will be further illustrated by the following examples, which are intended to be illustrative in nature and are not to be construed as limiting the scope of the invention. These examples have been previously presented in commonly-assigned application Ser. No. 08/552,213, now U.S. Pat. No. 5,668,354.

EXAMPLE 1

One suitable construction of an earplug assembly 10 (not shown) in accordance with the present invention was provided by the following combination of elements. The earplug utilized was a three flanged Ultrafit® earplug manufactured by Aearo Corporation, Southbridge, Mass.

| Earplug, 15: | Ultrafit ® Earplug |
|---|---|
| Exposed Stem 25: | ⅝" |
| Attachment Member, 20: | |
| Material | Attane ® Copolymer Film |
| Length | 3½" |
| Width | ½" |
| Thickness | 2 mils |
| Attachment Mechanism | Adhesive (Available from AC-Products) |

The earplug stems were grasped by a user. The user slowly pulled the plugs in an outwardly direction thereby stretching attachment member 20 until the desired second length of 23 inches. Attachment member 20 further has a resulting width of ⅜ inches and a gauge thickness of 0.001 inch.

EXAMPLE 2

In another suitable construction, earplug assembly 10 was provided by the following combination of elements. The earplug utilized was a E.Z.Fit® eyewear manufactured by Cabot Safety Corporation, Southbridge, Mass.

| Earplug, 15: | E.Z.Fit ® Earplug |
|---|---|
| Exposed Stem 25: | None |
| Attachment Member, 20: | |
| Material | Attane ® Copolymer Film |
| Length | 4" |
| Width | ⅝" |
| Thickness | 2 mils |
| Attachment Mechanism | thermoweld |

The ends of eyewear 15 were grasped by a user. The user slowly pulled the plugs in an outwardly direction thereby stretching attachment member 20 until the desired length of 24 inches. Attachment member 20 further had a resulting width of ⅜ inches and a gauge thickness of 0.001±10% inch.

As illustrated above, the present invention provides an alternative attachment mechanism for eyewear which provides users with the ability and flexibility to customize the attachment mechanism to an optimum length and style without sacrificing strength. In addition, the eyewear assembly can be simply and inexpensively produced while minimizing risk of misplacement and loss, as well as the waste associated with additional fasteners.

Although particular embodiments of the invention have been described in detail for purposes of illustration, various modifications may be made without departing from the spirit and scope of the invention. For example, although the present invention has been directed to an eyewear assembly, it is believed that the attachment member described herein would be suitable for use on other safety products such as safety prescription and nonprescription eyewear and frames.

Attachment member 20 may be suitably affixed to the end of eyewear temples and provide the same advantages as described with respect to earplugs. It should be noted that the material of construction for attachment member 20 would be adjusted accordingly to yield the desired strength and flexibility.

What is claimed is:

1. An eyewear assembly comprising:

a set of eyewear having a lenspiece and two temple members; and a single-cord extendable attachment member securely connected between each temple member, wherein said attachment member has a first predetermined length defining a first distance and upon extension to a second length, said attachment member substantially retains said second length, and defines a second distance, and further wherein such extension provides for customization of the second length of the attachment member.

2. The eyewear assembly of claim 1 wherein said attachment member comprises one of polypropylene, polethylene, copolymers of polypropylene and polyethylene, ABS resin, ethylene vinyl acetate and high impact polystyrene.

3. The eyewear assembly of claim 2 wherein said material is a low density polyethylene.

4. The eyewear assembly of claim 2 wherein said material is a high density polyethylene.

5. The eyewear assembly of claim 2 wherein said material is a linear low density polyethylene.

6. The eyewear assembly of claim 2 wherein said material is an ultra low density polyethylene.

7. The eyewear assembly of claim 2 wherein said material is an ultra low density ethylene octene copolymer.

8. The eyewear assembly of claim 7 wherein said first predetermined length is between 2 inches and 10 inches.

9. The eyewear assembly of claim 7 wherein said first predetermined length is between 4 inches and 6 inches.

10. The eyewear assembly of claim 7 wherein said attachment member has a first predetermined width between ½ inches and ⅝ inches.

11. The eyewear assembly of claim 7 wherein said attachment member has a thickness between 0.002 inches and 0.004 inches.

12. The eyewear assembly of claim 7 wherein said attachment member has a first predetermined length between 4 inches and 6 inches, a first predetermined width between ½ inches and ⅝ inches, and a thickness between 0.002 inches and 0.004 inches.

13. The eyewear assembly of claim 1 wherein said attachment member comprises linear low density polyethylenes based on ethylene, octene, butene, hexene, and copolymers thereof, and ethylene vinyl acetate.

14. The eyewear assembly of claim 1 wherein said first predetermined length is between 2 inches and 10 inches.

15. The eyewear assembly of claim 14 wherein said first predetermined length is between 4 inches and 6 inches.

16. The eyewear assembly of claim 1 wherein said second length is a multiple of said first predetermined length.

17. The eyewear assembly of claim 1 wherein said attachment member is formed of a material which deforms to said second length upon application of a force extending said attachment member and wherein said attachment member substantially retains said extended second length upon removal of said force.

18. An eyewear assembly comprising:

a set of eyewear having a lenspiece and two temple members; and a single-cord extendable attachment member securely connected between each temple member, wherein said attachment member has a first predetermined length defining a first distance between each temple member, and upon extension to a second length substantially retains its extended second length and defines a second, greater distance between each temple member, and further wherein such extension provides for customization for the second length of the attachment member.

19. The eyewear assembly of claim 18 wherein said attachment member is formed of a material which deforms to said second length upon application of a force extending said attachment member to said extended second length and wherein said attachment member substantially retains said extended second length upon removal of said force.

20. The eyewear assembly of claim 18 wherein said attachment member comprises one of polypropylene, polyethylene, copolymers of polypropylene and polyethylene, ABS resin, ethylene vinyl acetate and high impact polystyrene.

* * * * *

UNITED STATES PATENT AND TRADEMARK OFFICE
CERTIFICATE OF CORRECTION

PATENT NO. : 5,917,576
DATED : June 29, 1999
INVENTOR(S) : Robert N. Falco

It is certified that error appears in the above-identified patent and that said Letters Patent is hereby corrected as shown below:

Column 4 line 34 delete "eyewear" and insert therefor --earplug--
Column 4 line 47 delete "eyewear" and insert therefor --earplug--

Signed and Sealed this

Fourth Day of July, 2000

Attest:

Q. TODD DICKINSON

Attesting Officer

Director of Patents and Trademarks